(12) United States Patent
Lee

(10) Patent No.: US 8,379,089 B2
(45) Date of Patent: Feb. 19, 2013

(54) SUPPORT DEVICE FOR CAMERA MODULES

(75) Inventor: Young-Soo Lee, Yongin-si (KR)

(73) Assignee: C-Pro Electronics Co., Ltd., Sungnam (KR)

( * ) Notice: Subject to any disclaimer, the term of this patent is extended or adjusted under 35 U.S.C. 154(b) by 343 days.

(21) Appl. No.: 12/922,862

(22) PCT Filed: Jun. 26, 2008

(86) PCT No.: PCT/KR2008/003674
§ 371 (c)(1),
(2), (4) Date: Sep. 16, 2010

(87) PCT Pub. No.: WO2009/136679
PCT Pub. Date: Nov. 12, 2009

(65) Prior Publication Data
US 2011/0019074 A1 Jan. 27, 2011

(30) Foreign Application Priority Data
May 8, 2008 (KR) .................. 10-2008-0042850

(51) Int. Cl.
H04N 7/18 (2006.01)
H04N 5/225 (2006.01)
G03B 17/00 (2006.01)
(52) U.S. Cl. .................. 348/151; 348/373; 396/427
(58) Field of Classification Search .................. 348/143, 348/151, 373–376; 396/427, 428; D16/203
See application file for complete search history.

(56) References Cited

U.S. PATENT DOCUMENTS

| 5,418,567 | A | 5/1995 | Boers et al. | |
| 5,995,758 | A | 11/1999 | Tyler | |
| 7,387,453 | B2 * | 6/2008 | Arbuckle | 396/419 |
| 7,473,040 | B2 * | 1/2009 | Kenoyer et al. | 396/428 |
| 7,929,049 | B2 * | 4/2011 | Yamane et al. | 348/373 |
| 2009/0207250 | A1 * | 8/2009 | Bennett et al. | 348/144 |

FOREIGN PATENT DOCUMENTS

| KR | 10-0596624 B | 7/2006 |
| KR | 10-2008-0011962 A | 2/2008 |

OTHER PUBLICATIONS

International Search Report for PCT/KR2008/003674.

* cited by examiner

Primary Examiner — Daniel M Pasiewicz
(74) Attorney, Agent, or Firm — LRK Patent Law Firm

(57) ABSTRACT

A support device for camera modules is disclosed. The support device is capable of panning or spinning a camera module without separating an outer casing that surrounds the camera module. The support device includes a body, a second middle support unit, a rear cover, and a rotary support unit. The body includes a camera module therein. The second middle support unit is rotatably fitted to a side surface of the body, and has on an outer surface of the second middle support unit two opposing wheels to be fitted into coupling bosses of the rotary support unit. The rear cover is coupled to the second middle support unit, and has on an inner surface thereof a seating step so that the body is rotatably seated thereon. The rotary support unit has the two coupling bosses to support the two wheels of the second middle support unit.

11 Claims, 5 Drawing Sheets

SUPPORT DEVICE FOR CAMERA MODULES

TECHNICAL FIELD

The present invention relates, in general, to a support device for camera modules. More particularly, the present invention relates to a support device for camera modules, which is capable of panning or spinning a camera module without separating an outer casing that surrounds the camera module.

BACKGROUND ART

FIG. 1 is a view illustrating a conventional support device for camera modules. The support device for camera modules includes a base support frame, a middle support part, a lower support part, and an upper support part. These will be described below in detail.

Support bosses 11 and 12 are provided on both sides on the top of the base support frame 10, so that rotary bosses 21 and 22, provided on the outer surface of a first support part 20, are rotatably coupled to the support bosses 11 and 12. The first support part 20 is installed in the base support frame 10 in such a way as to rotate in a vertical direction. Bosses 31 and 32, provided on the outer surface of a second support part 30, are coupled to corresponding rotary bosses 23 and 24 provided on both sides of the first support part 20, so that the second support part 30 is placed in a space defined in the first support part 20. The second support part 30 is coupled to the first support part 20 to be rotated perpendicularly relative to the first support part 20.

Further, a camera module is mounted on the upper surface of the second support part 30, so that it is possible to adjust the position of the camera module 40.

The conventional support device for camera modules is advantageous in that the first and second support parts 20 and 30 are rotated vertically, so that the position of the camera module 40 can be adjusted. However, the conventional support device is problematic in that the camera module 40, mounted on the upper portion of the second support part 30, cannot be rotated in a horizontal direction, so that the installation of the camera module 40 is limited to a specific position.

That is, the top and bottom of the camera module are fixed. However, according to the condition of the installation site, the camera module may be laid at 90 degrees. In this case, the image displayed on a screen is rotated 90 degrees.

Thus, the support device is problematic in that it is impossible to adjust the horizontal rotating angle of the camera module.

FIG. 2 is a view illustrating a support device for camera modules, which is disclosed in Korean Patent No. 10-0596624. According to the cited document, the support device allows a camera module to be rotated in a horizontal direction, so that the camera module can be freely installed at various angles. However, the support device is problematic in that it must be dismantled when a user desires to adjust the angle of the camera module horizontally and vertically, thus inconveniencing the user. Further, the support device is problematic in that it is impossible to adjust the angle of the camera module from the exterior, even at the time of installation. Thus, in order to adjust the angle of the camera module after the assembly of the support device for camera modules has been completed, the support device must be dismantled again, so that it is complicated to adjust the angle of the camera module. Therefore, a long work period is required and work efficiency is reduced.

DISCLOSURE OF INVENTION

Technical Problem

Accordingly, the present invention has been made keeping in mind the above problems occurring in the prior art, and an object of the present invention is to provide a support device for camera modules, which is capable of rotating a camera module without separating an outer casing that surrounds the camera module so as to rotate the camera module.

Technical Solution

In order to accomplish the above object, according to the first aspect of the invention, the present invention provides a support device for camera modules, including a body which has a camera module therein, a second middle support unit which is rotatably fitted to a side surface of the body and has on an outer surface of the second middle support unit two opposing wheels to be fitted into coupling bosses of a rotary support unit, a rear cover which is coupled to the second middle support unit and has on an inner surface thereof a seating step so that the body is rotatably seated thereon, and the rotary support unit which has the two coupling bosses to support the two wheels of the second middle support unit.

According to the second aspect of the invention, the present invention provides a support device for camera modules, including a camera-module support unit which includes a spin-rotation unit having a spur gear comprising two toothed wheels to spin a camera module, and the camera module coupled to the spin-rotation unit, an outer casing unit which surrounds the camera module, and a spin lever which is installed in the outer casing unit.

The spin lever is coupled to one of the toothed wheels of the spur gear to transmit rotating force of the spin lever.

The spin-rotation unit is rotated by the spur gear, which is operated by the rotation of the spin lever, so that the camera module is spun.

According to the third aspect of the invention, the present invention provides a support device for camera modules, including a camera-module support unit which includes a pan-tilt unit having a worm gear to pan a camera module, and the camera module coupled to the pan-tilt unit, an outer casing unit which surrounds the camera-module support unit, and a pan lever installed in the outer casing unit.

Here, the pan lever is coupled to a worm of the worm gear to transmit rotating force of the pan lever.

The pan-tilt unit is panned by rotation of the worm wheel coupled to the worm as the pan lever is rotated, so that the camera module is panned.

Advantageous Effects

According to the present invention, a support device for camera modules allows a camera module to be easily rotated without separating an outer casing that surrounds the camera module so as to rotate the camera module in a desired direction, so that work efficiency for rotating the camera module is improved.

Particularly, when the camera module is being mounted or is mounted to a ceiling or wall, the support device for camera modules according to the present invention is more useful.

MODE FOR THE INVENTION

Hereinbelow, the construction and operation according to the embodiments of the present invention will be described in detail with reference to the accompanying drawings.

Figure 1:
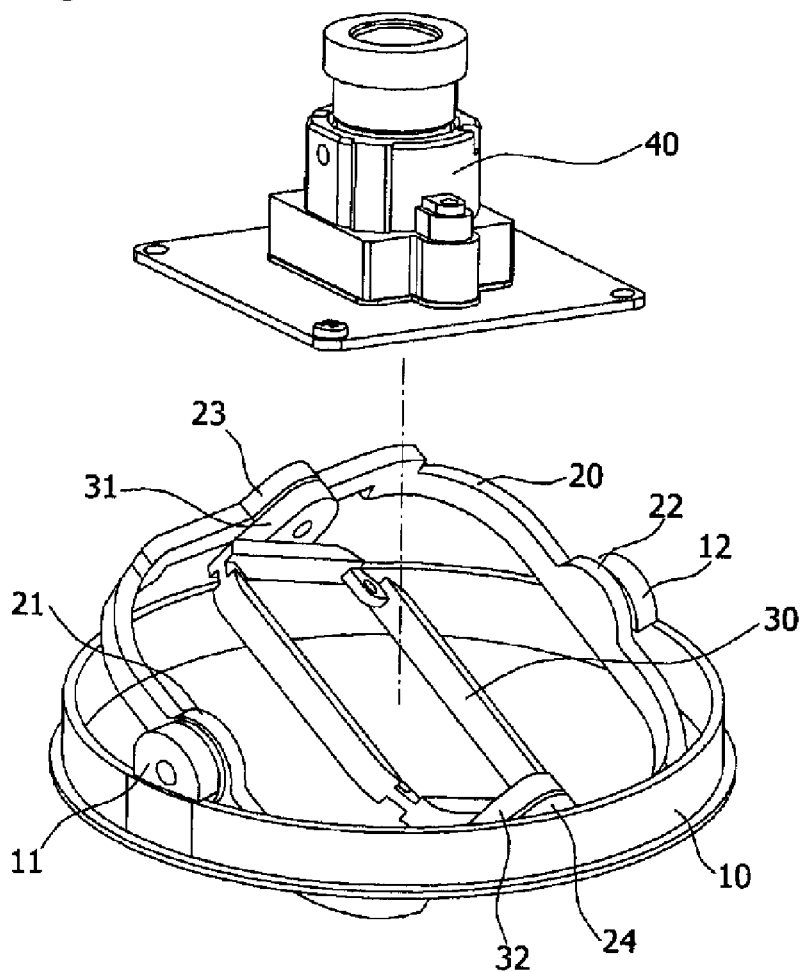
FIG. 1 is a view illustrating a conventional support device for camera modules.
Figure 2:
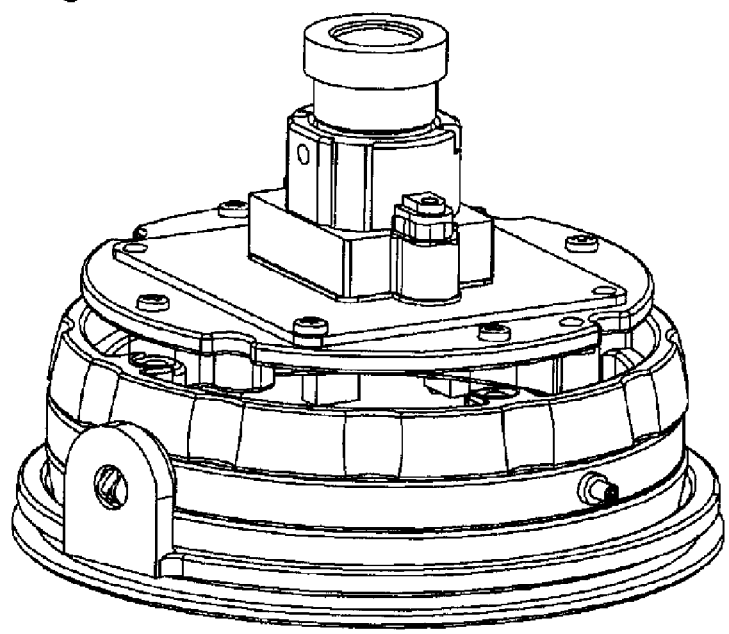
FIG. 2 is a view illustrating a support device for camera modules, which is disclosed in Korean Patent No. 10-0596624.
Figure 3:
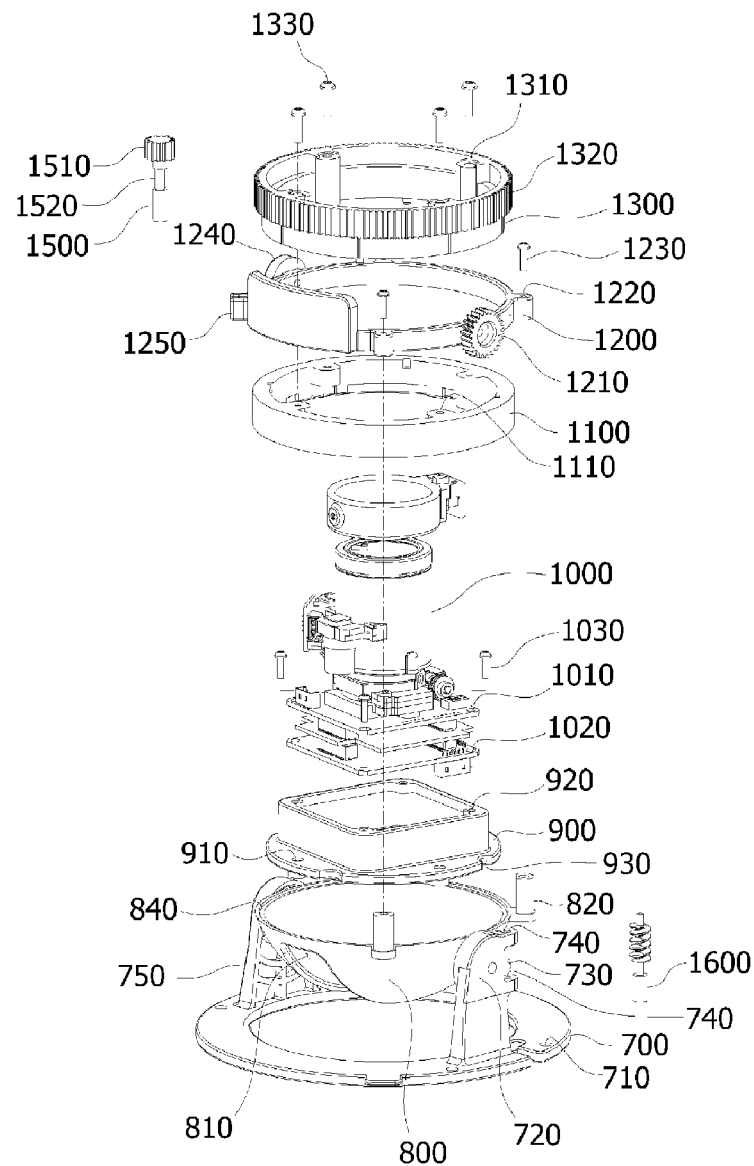
FIG. 3 is an exploded perspective view illustrating a support device for camera modules, according to an embodiment of the present invention.

FIG. 3 is an exploded perspective view illustrating a support device for camera modules according to an embodiment of the present invention.

As shown in FIG. 3, the support device includes a rotary support unit 700, and a rotary unit which includes a camera module 1000 and is coupled to the rotary support unit 700. In a detailed description, the support device includes a body having a camera module therein, a pan-tilt support unit 1200, a rear cover 800, and the rotary support unit 700. The pan-tilt support unit 1200 is rotatably fitted to the side surface of the body, and has two wheels which are provided on opposite sides of the outer surface of the pan-tilt support unit 1200 to be connected to coupling bosses of the rotary support unit 700. The rear cover 800 is coupled to the pan-tilt support unit 1200, with a seating step provided on the inner surface of the rear cover 800 such that the body is rotatably seated on the seating step. The rotary support unit 700 includes the two coupling bosses, to which the wheels of the pan-tilt support unit 1200 are coupled.

Further, the body is coupled with the camera module 1000, and includes a lower support unit 900, which is seated on the seating step, a middle support unit 1100, which is coupled to the lower support unit 900, and a spin-rotation support unit (upper support unit) 1300, which is coupled to the middle support unit 1100. The pan-tilt support unit (second middle support unit) 1200 is rotatably fitted to the lower portion of the spin-rotation support unit 1300 in such a way as to be positioned between the spin-rotation support unit 1300 and the middle support unit 1100.

The rotary support unit 700 has the shape of a ring which has a hollow portion therein. The coupling bosses 720 and 750 for the pan-tilt support unit 1200 protrude upwards from the upper surface of the rotary support unit 700 in such a way as to be opposite each other. A plurality of dome locking holes 710 is formed in the upper surface of the rotary support unit 700.

A worm wheel 1210 and a locking wheel 1240 of the pan-tilt support unit 1200 are individually inserted into the upper portions of the corresponding coupling bosses 720 and 750 for the pan-tilt support unit 1200. Pan-worm fitting parts 740 protrude upwards and downwards at a predetermined position on the upper portion of the pan-tilt-support unit coupling boss 720, to which the worm wheel 1210 is coupled, so that a pan worm 1600 is fitted into the pan-worm fitting parts 740. A groove 730 is defined between the pan worm fitting parts 740, and the pan worm 1600 is held in the groove 730 in such a way that a screw part of the pan worm 1600 is exposed to the outside. The pan worm 1600 is coupled to the worm wheel 1210, thus providing a worm gear.

The rotary unit includes the rear cover 800, the pan-tilt support unit 1200, the spin-rotation support unit 1300, the middle support unit 1100, and the lower support unit 900. The rear cover 800 has the shape of a dome which is hollow therein. The pan-tilt support unit 1200 is coupled to the rear cover 800. The lower portion of the spin-rotation support unit 1300 is inserted into the pan-tilt support unit 1200. The middle support unit 1100 is positioned under the pan-tilt support unit 1200, and is coupled to the spin-rotation support unit 1300. The lower support unit 900 is coupled to the camera module 1000 and the middle support unit 1100, and the lower portion of the lower support unit 900 is seated on the seating step in the rear cover 800.

The rear cover 800 has the shape of a dome which is hollow therein. A cut part 810 is formed in the spherical surface of the rear cover 800, and coupling rods 820 are provided around the circular opening of the rear cover 800 in such a way as to protrude upwards, with locking holes formed in the coupling rods 820.

Further, the inner edge of the circular opening of the rear cover 800 is concavely depressed, thus providing the seating step 840. A lower disk 930 of the lower support unit 900 is seated on the seating step 840 so that the lower support unit 900 spins along the seating step 840.

The lower support unit 900 has on a lower portion thereof the annular lower disk 930 having a hollow portion therein. Locking holes 910 are formed in the outer portion of the lower disk 930 such that fastening screws or fastening bolts are tightened into the locking holes 910. The upper portion of the lower support unit 900 includes a square pillar having a hollow portion therein. Module locking holes 920 are formed in the corners of the upper end of the square pillar, so that fastening screws for fastening the camera module to the lower support unit 900 are tightened into the module locking holes 920.

The middle support unit 1100 has the shape of a ring which has a hollow portion therein, and locking protrusions 1110, each having a locking hole, are provided on the inner circumference of the middle support unit 1110 to correspond to the locking holes 910 in the lower support unit 900.

The pan-tilt support unit (second middle support unit) 1200 has the shape of a ring which has a hollow portion therein. Locking protrusions 1220, each having a locking hole, are provided on the outer circumference of the pan-tilt support unit 1200 to correspond to the coupling rods 820 of the rear cover 800. Further, the worm wheel 1210 and the locking wheel 1240 are separately provided on the pan-tilt support unit 1200 at positions corresponding to the pan-tilt-support unit coupling bosses 720 and 750 of the rotary support unit 700, and a spin-gear support 1250 protrudes from the outer circumference of the pan-tilt-support unit 700 so that a spin gear 1500 is coupled to the spin-gear support 1250.

The central portion of the spin-gear support 1250 is bored through to form an inner through hole, and part of the outer circumference of the spin-gear support 1250 is cut vertically to form a slit. The slit is narrower than the inner through hole. A throat 1520 of the spin gear 1500 is fitted through the slit into the spin-gear support 1250.

The spin-rotation support unit (upper support unit) 1300 has the shape of a ring which has a hollow portion therein. A stepper 1320 is provided on the outer circumference of the upper portion of the spin-rotation support unit 1300, and comprises a toothed wheel which is meshed with the spin gear 1500 to form a spin spur gear. The outer circumference of the lower portion of the spin-rotation support unit 1300, which has a smaller diameter than the outer circumference of the upper portion thereof, is in close contact with the inner circumference of the pan-tilt support unit 1200. Locking protrusions 1310, each having a locking hole, are provided on the inner circumference of the spin-rotation support unit 1300 at positions corresponding to the locking protrusions 1110 of the middle support unit 1100.

The spin gear 1500 has a cylindrical shape. A toothed wheel 1510 is provided on the upper end of the spin gear 1500, and the throat 1520 is provided on the middle portion of the spin gear 1500 to be fitted through the slit into the spin-gear support 1250 of the pan-tilt support unit 1200.

The pan worm 1600 has a cylindrical shape. The screw part is provided on the upper portion of the pan worm 1600. Upper and lower portions of the screw part are fitted into the pan-worm fitting parts 740 of the coupling boss 720 of the rotary support unit 700, to which the worm wheel 1210 is fitted.

The camera module 1000 is assembled with the lower support unit 900 by tightening fastening means 1030, such as fastening screws or bolts, into locking holes 1010 and 1020 formed in the camera module and the locking holes 920 in the lower support unit.

The elements are assembled as follows.

First, the spin-rotation support unit 1300, the middle support unit 1100, and the lower support unit 900 are integrally coupled to each other by tightening fastening means 1330, such as screws or bolts, into the locking holes in the corresponding locking protrusions 1310 and 1110 and the locking holes 910, thus providing a first assembly.

Further, the pan-tilt support unit 1200 and the rear cover 800 are coupled to each other by tightening fastening means 1230, such as screws or bolts, into the corresponding locking protrusions 1220 and the coupling rods 820, thus providing a second assembly.

Here, the lower disk 930 of the lower support unit 900 is seated on the seating step 840 of the rear cover 800, thus preventing the lower support unit from undesirably moving downwards. Further, in the state in which the lower portion of the spin-rotation support unit 1300 is fitted into the pan-tilt support unit 1200 in such a way as to be in close contact with the inner surface of the pan-tilt support unit 1200, the first assembly is made. The outer diameter of the middle support unit 1100 is larger than the inner diameter of the pan-tilt support unit 1200, thus preventing the first assembly from moving upwards relative to the second assembly, and thereby preventing the first assembly from being removed from the second assembly. Further, the outer diameter of the upper portion of the spin-rotation support unit 1300 is larger than the inner diameter of the pan-tilt support unit 1200, thus preventing the first assembly from moving downwards relative to the second assembly, and thereby preventing the first assembly from being removed from the second assembly. Thereby, the first and second assemblies are combined with each other in such a way that they spin freely, thus providing an integrated rotary unit.

The camera module 1000 is fastened to the lower support unit 900 using fastening means such as screws, and is positioned in the hollow portions of the spin-rotation support unit 1300, the pan-tilt support unit 1200, and the middle support unit 1110.

Further, since the locking wheel 1240 and the worm wheel 1210 of the pan-tilt support unit 1200 are respectively fitted to the corresponding coupling bosses 720 and 750 of the rotary support unit 700, the rotary unit, comprising the first and second assemblies, is locked to the rotary support unit 700.

Figure 4:
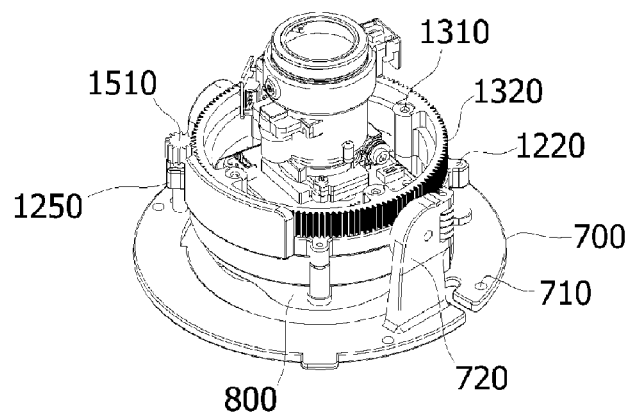
FIG. 4 is a perspective view illustrating the assembled state of the support device of FIG. 3.

FIG. 4 is a perspective view illustrating the assembled state of the support device of FIG. 3.

In the support device for the camera module, which is assembled in this way, the spin-rotation or the pan-tilt of the camera module 1000 is as follows.

First, the spin-rotation of the camera module 1000 is performed as follows. As the stepper 1320 is rotated by the spin gear 1500, the spin-rotation support unit 1300 is rotated. Further, the lower support unit 900, which is coupled to the spin-rotation support unit 1300 via the middle support unit 1100, is rotated. Consequently, the camera module 1000, coupled to the lower support unit 900, is spun. That is, the spin gear 1500, the spin-rotation support unit 1300, the middle support unit 1100, and the lower support unit 900 constitute a spin-rotation unit.

Next, the pan-tilt of the camera module 1000 is performed as follows. As the worm wheel 1210 is rotated by the pan worm 1600, the pan-tilt support unit 1200, integrated with the worm wheel 1210, is panned around an axis coupling the worm wheel 1210 and the locking wheel 1240, and the lower support unit 900 and the camera module 1000, which are integrally coupled to the pan-tilt support unit 1200, are panned. That is, the pan worm 1600, the pan-tilt support unit 1200, the lower support unit 900, and the middle support unit 1100 constitute a pan-tilt unit.

Figure 5:
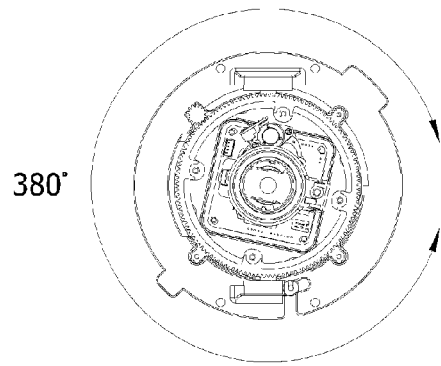
FIG. 5 is a view illustrating the operation of adjusting the spin-rotation of the camera module using a spin gear.

FIG. 5 is a view illustrating the operation of adjusting the spin-rotation of the camera module 1000 using the spin gear 1500.

Since the spin gear 1500 engages with the stepper 1320 of the spin-rotation support unit 1300, the camera module 1000 can be spun within an angular range of 380 degrees.

Figure 6:
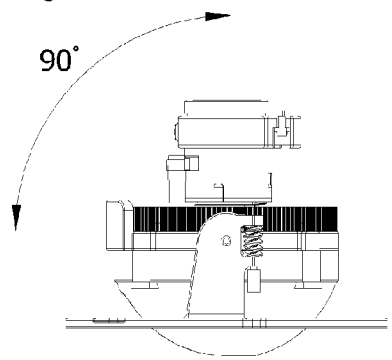
FIG. 6 is a view illustrating the operation of adjusting the pan-tilt of the camera module using a pan worm.

FIG. 6 is a view illustrating the operation of adjusting the pan-tilt of the camera module using the pan worm.

Since the worm wheel 1210 of the pan-tilt support unit 1200 is coupled to the upper portion of the coupling boss 720 for the pan-tilt support unit 1200, and the pan worm 1600 engages with the worm wheel 1210, the vertical angle of the camera module 1000 can be regulated within an angular range from 0 degrees to 90 degrees by the rotation of the pan worm 1600.

Figure 7:
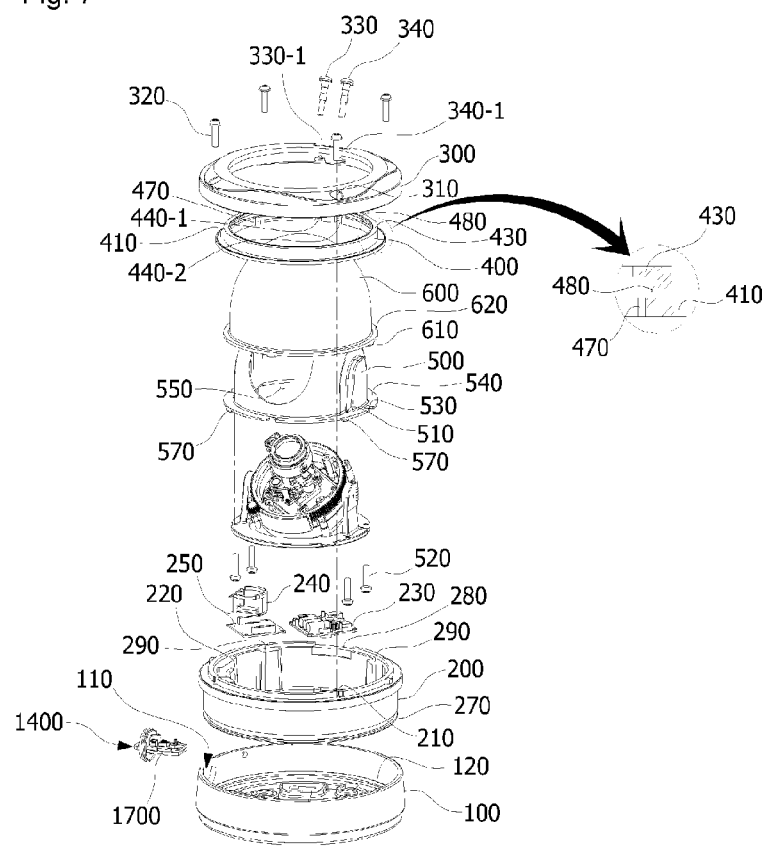
FIG. 7 is an exploded perspective view illustrating a support device for camera modules, according to another embodiment of the present invention.

FIG. 7 is an exploded perspective view illustrating a support device for camera modules, according to another embodiment of the present invention. The embodiment shown in FIG. 7 includes, as one element, the support device for camera modules, which is illustrated in FIG. 3.

The support device for camera modules includes a camera-module support unit (the support device for camera modules shown in FIG. 3), and an outer casing unit. The outer casing unit includes a base support unit, a base coupling unit, a base-coupling-unit cover, a dome gasket, a dome cover, and a dome insert part.

The base support unit 100 has a cylindrical shape, and a semi-circular outer hole 110 is formed in a sidewall of the base support unit 100 so as to support a circular camera-module-control knob 1400. A camera module controller 1700 for controlling the function of the camera module is provided on the camera-module-control knob 1400 at a predetermined position. A protruding part is provided on the bottom of the base support unit 100 so as to secure the support device to a ceiling or wall, with a mounting hole formed in the protruding part. Further, a projecting ring 120 is provided on the inner circumference of the lower portion of the base support unit 100.

The base coupling unit 200 has the shape of a cylinder which is closed at the bottom thereof. Base locking holes 210 are formed in the upper surface of the base coupling unit 200 to be coupled to base locking holes 310 in a base-coupling-unit cover 300 using base locking bolts 320. An inner hole 220 is formed at a predetermined position in the sidewall of the base coupling unit 200 so that the camera-module-control knob 1400 of the base support unit 100 is supported in the inner hole 220. A guide groove 270 is provided in the outer circumference of the base coupling unit 200. Thus, when the base coupling unit 200 is closely fitted into the base support unit 100, the projecting ring 120 of the base support unit 100 is fitted into the guide groove 270. The base coupling unit 200 can be rotated in the base support unit 100 along the guide groove 270. Further, the guide groove 270 and the projecting ring 120 cooperate with each other to prevent the removal of the base coupling unit 200.

Further, inner steps 290 are provided on the inner circumference of the base coupling unit 200 so that a flange 540 of the dome insert part 500 and a flange 410 of the dome gasket are seated on the inner steps 290. A protruding-rib fitting groove 280 is formed at a predetermined position in the upper portion of the base coupling unit 200 so that a protruding rib 420 of the dome gasket is fitted into the protruding-rib fitting groove 280. A voltage supply part and a camera control circuit are provided on the bottom of the base coupling unit 200.

The dome cover 600 has the shape of a hemisphere which is made of a transparent material, and has a hollow space in the hemisphere. The dome insert part 500 is inserted into the hollow space of the hemisphere, and an annular flange 620 is provided around an opening which is provided in the lower portion of the dome cover 600, with small protuberances 610 formed at predetermined positions on the lower surface of the flange 620.

The dome insert part 500 has the shape of a hemisphere which is hollow therein. A cut part 550 is formed in a sidewall of the dome insert part 500 to correspond to the panning area of the camera module, and the annular flange 540 is provided around the lower opening of the dome insert part 500. Notches 530 are formed in the flange 540 so that the protuberances 610 of the dome cover 600 fit into the notches 530.

Further, locking holes 510 are formed in the flange 540 at positions corresponding to the locking holes 710 in the rotary support unit 700, so that the dome insert part 500 and the rotary support unit 700 are assembled with each other by tightening fastening means 520, such as screws or bolts, into the locking holes 510 and 710.

Further, protuberances 570 are provided at predetermined positions on the bottom of the flange 540, and are inserted into holes 470 in the dome gasket 400. Thereby, the dome gasket and the camera-module support unit are coupled to each other via the dome insert part. Thus, as the dome gasket rotates, the camera-module support unit is also rotated.

The dome gasket 400 has the shape of a ring which has a hollow portion, and is made of an elastic material. The annular flange 410 is provided on the lower portion of the dome gasket 400, and an annular locking protrusion 430 is provided at an inner position on the upper portion of the dome gasket 400. The protruding rib 420 (see FIG. 8) is provided at a predetermined position on the flange 410, and is fitted into the protruding-rib fitting groove 280 of the base coupling unit 100. Further, lever seats 440-1 and 440-2 are provided at predetermined positions on the dome gasket 400 so that a spin lever and a pan lever are seated into the corresponding lever seats 440-1 and 440-2.

Further, a groove 480 is provided in the upper portion of the inner circumference of the dome gasket 400 such that the flange 620 of the dome cover 600 and the flange 540 of the dome insert part 500 are fitted into the groove 480. The holes 470 are formed at predetermined positions in the lower portion of the dome gasket 400 such that the protuberances 570 provided on the lower surface of the flange 540 of the dome insert part 500 are fitted into the holes 470. A circled portion in FIG. 7 is a sectional view showing part of the dome gasket.

While the locking protrusion 430 of the dome gasket 400 is placed on the flange 620 of the dome cover 600, the annular flange 410 is seated on the inner steps 290 of the base coupling unit 200.

The base-coupling-unit cover 300 has the shape of a ring which has a hollow portion. The locking holes 310 are formed in the base-coupling-unit cover 300 at positions corresponding to the locking holes 210 of the base coupling unit 200, so that the base-coupling-unit cover 300 is fastened to the base coupling unit 200 by tightening fastening means 320, such as screws or bolts, into the locking holes 310 and 210. Lever insert holes 330-1 and 340-1 are formed at predetermined positions in the base-coupling-unit cover 300 so that the spin lever 330 for spinning the camera module and the pan lever 340 for panning the camera module are respectively inserted into the corresponding lever insert holes 330-1 and 340-1.

The base-coupling-unit cover 300 is coupled to the base coupling unit 200 while the inner portion of the base-coupling-unit cover 300 covers the upper portion of the flange 410 of the dome gasket 400, thus preventing the removal of the dome gasket 400.

When the camera-module-control knob 1400 is separated from the base support unit 100, it is possible to adjust the function of the camera module using a circuit attached to the camera-module-control knob 1400 without disassembling the support device for camera modules.

Figure 8:
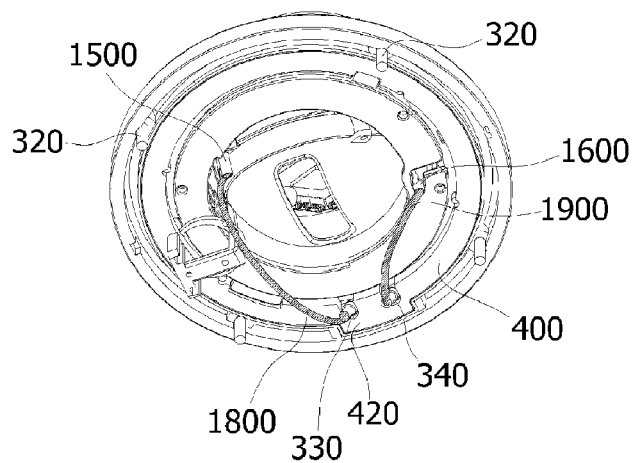
FIG. 8 is a bottom perspective view illustrating the assembled state of the support device for camera modules of FIG. 7, in which only parts other than a base support unit and a base coupling unit are shown in the drawing.

FIG. 8 is a bottom perspective view illustrating the assembled state of the support device for camera modules of FIG. 7, in which only parts other than the base support unit and the base coupling unit are shown in the drawing.

FIG. 8 shows the state in which a spin wire 1800 is connected between the spin gear 1500 and the spin lever 330, and a pan wire 1900 is connected between the pan worm 1600 (not shown) and the pan lever 340. Each of the wires 1800 and 1900 is made of a steel material, and is produced by twisting a plurality of strands of steel. Even if the spin lever or the pan lever is rotated so as to spin or pan the camera module, the rotating force of the spin lever or the pan lever is transmitted to the spin gear 1500 or the pan worm 1600 without twisting the wires. Thus, the vertical angle (angle formed by the pan-tilt) or the spin-rotation angle (angle formed by the spin-rotation) of the camera module can be adjusted.

Figure 9:
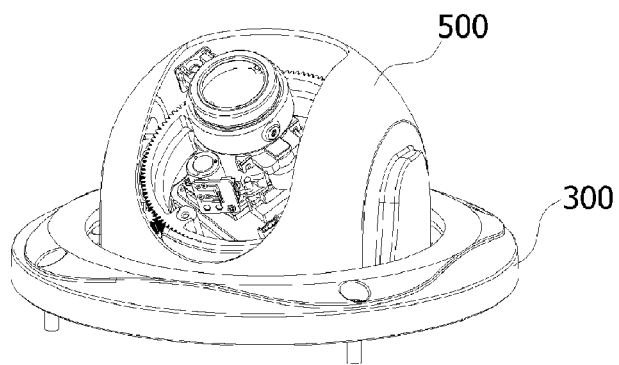
FIG. 9 is a top perspective view illustrating the assembled state of the support device for camera modules of FIG. 7, in which only parts other than the base support unit and the base coupling unit are shown in the drawing.

FIG. 9 is a top perspective view illustrating the assembled state of the support device for camera modules of FIG. 7, in which only parts other than the base support unit and the base coupling unit are shown in the drawing. In the drawing, the dome cover 600 is not shown.

Figure 10:
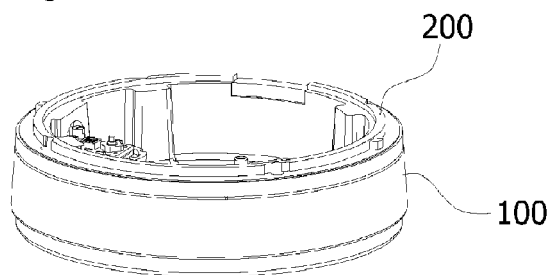
FIG. 10 is a view illustrating part of the support device for camera modules of FIG. 7.

FIG. 10 is a view illustrating part of the support device for camera modules of FIG. 7. That is, the drawing illustrates the state in which the base coupling unit 200 is fitted into the base support unit 100, and the camera-module-control knob 1400 passes through the outer hole 110 in the base support unit 100 and the inner hole 220 in the base coupling unit 200 to be installed in the base coupling unit 200.

Figure 11:
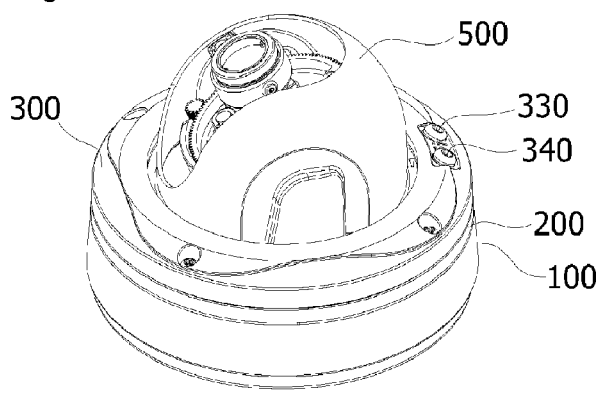
FIG. 11 is a view illustrating the support device for camera modules of FIG. 7, in which a dome cover is removed from the support device.

FIG. 11 is a view illustrating the support device for camera modules of FIG. 7, in which the dome cover is removed from the support device.

Figure 12:
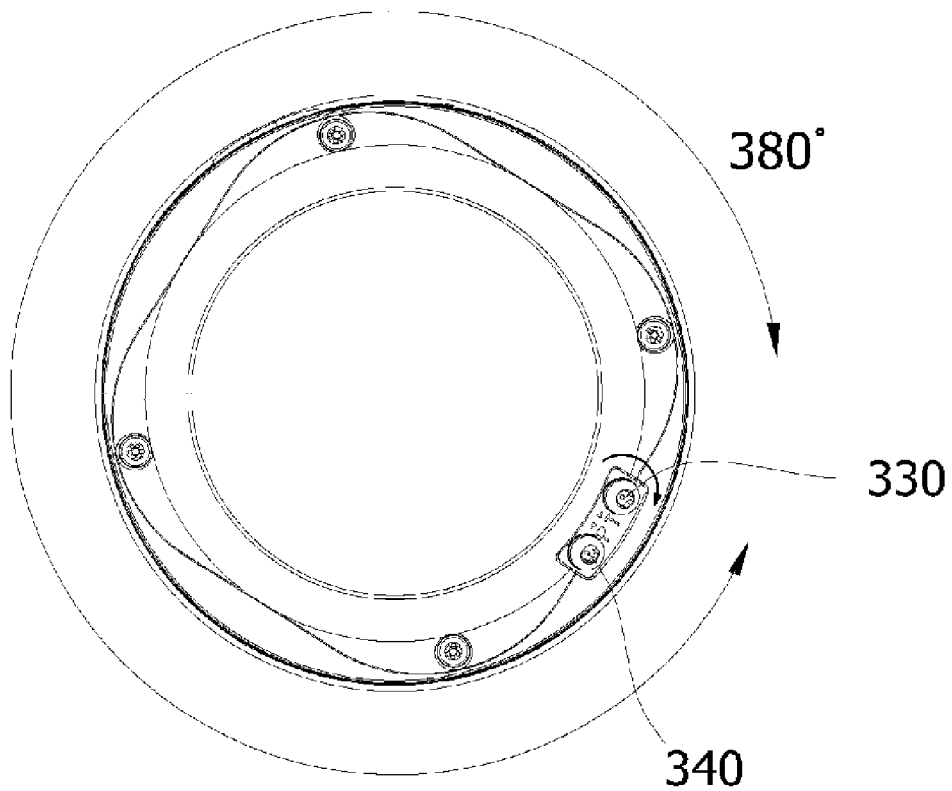
FIG. 12 is a view illustrating the operation of spinning a camera module using a spin lever when the support device for camera modules of FIG. 7 is assembled.

FIG. 12 is a view illustrating the operation of spinning the camera module using the spin lever when the support device for camera modules of FIG. 7 is assembled.

When the spin lever 330 is rotated using a screwdriver, the spin wire 1800 is rotated. The rotating force of the spin wire 1800 is transmitted to the spin gear 1500 without twisting the spin wire 1800, so that the spin gear 1500 is rotated. The stepper 1320, engaging with the spin gear 1500, is rotated. Thereby, as described above, the camera module is spun. The maximum spinning angle of the camera module is 380 degrees.

When an image formed in the camera, mounted to a ceiling or wall, is inverted or rotated 90 degrees due to the spin-rotation of the camera module, it is possible to accurately focus an image on the camera by spinning the camera module using the spin lever 330 without disassembling the support device.

Similarly, when the pan lever 340 is rotated, the pan wire 1900 is rotated, and the rotating force of the pan wire 1900 is transmitted to the pan worm 1600, so that the pan worm 1600 is rotated. At this time, since the worm wheel 1210, engaged with the pan worm 1600, is rotated, as described above, the camera module is panned. The maximum panning angle of the camera module is 90 degrees.

Figure 13:
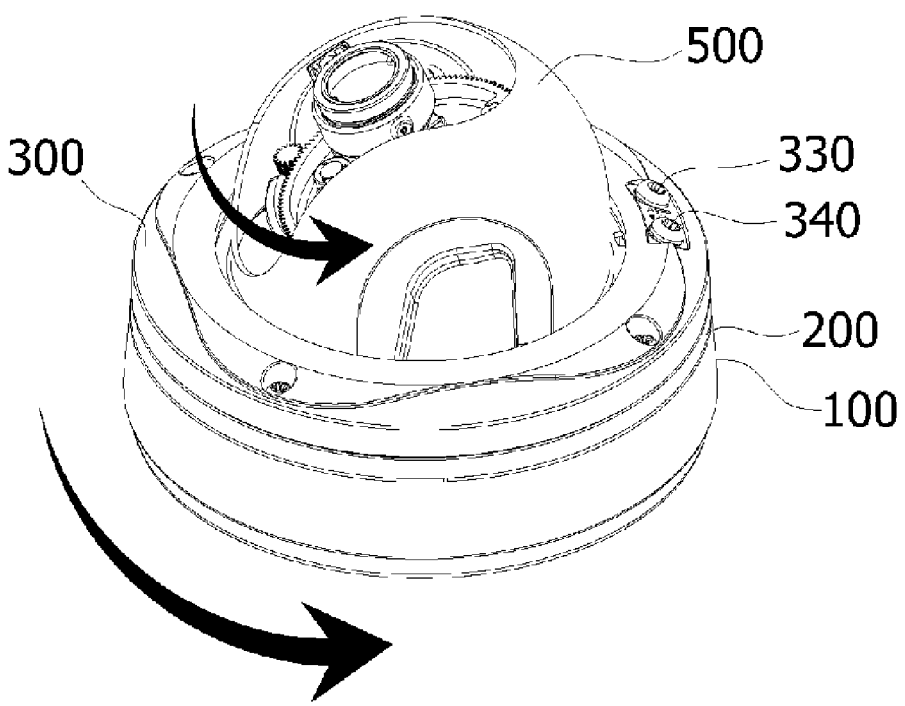
FIG. 13 is a view illustrating the operation of adjusting a horizontal observation angle of the camera module by rotating the base coupling unit of the support device for camera modules.

FIG. 13 is a view illustrating the operation of adjusting the horizontal observation angle of the camera module by rotating the base coupling unit of the support device for camera modules.

That is, in the state where the base support unit 100 is mounted to a wall or ceiling, when the base-coupling-unit cover 300, which is fastened, using screws or the like, to the base coupling unit 200, fitted into the base support unit 100, is rotated, the base coupling unit 100, coupled to the base-coupling-unit cover 300, is rotated, and the dome gasket 400, coupled to the base coupling unit 100, is also rotated. The camera-module support unit coupled to the dome gasket 400 via the dome insert part 500 is rotated in the same direction, so that the horizontal observation angle of the camera module is changed. Thereby, it is possible to adjust the horizontal direction which is to be observed by the camera.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A support device for camera modules, comprising:
   a body, including a camera module therein, comprising a lower support unit coupled to the camera module and seated on the seating step, a middle support unit coupled to the lower support unit, and an upper support unit coupled to the middle support unit;
   a second middle support unit, rotatably fitted to a side surface of the body, and having on an outer surface of the second middle support unit two opposing wheels to be fitted into coupling bosses of a rotary support unit;
   a rear cover, coupled to the second middle support unit, and having on an inner surface thereof a seating step so that the body is rotatably seated thereon; and
   the rotary support unit, having the two coupling bosses to support the two wheels of the second middle support unit,
   wherein the second middle support unit is positioned between the upper support unit and the middle support unit, while being rotatably coupled to a lower portion of the upper support unit.

2. The support device according to claim 1, wherein the upper support unit has a shape of a ring which has a hollow portion therein, with a toothed stepper provided on an outer circumference of an upper portion of the upper support unit.

3. The support device according to claim 1, wherein one of the two wheels provided on the second middle support unit comprises a worm wheel having on an outer circumference thereof teeth.

4. The support device according to claim 2, wherein
   the second middle support unit has on an outer surface thereof a spin-gear support so that the spin gear is fitted into the spin-gear support,
   the spin gear has on a predetermined portion thereof a toothed wheel,
   the toothed wheel of the spin gear and the stepper constitute a spin spur gear, while part of the spin gear is fitted into the spin-gear support, and
   the upper support unit is rotated by the stepper, which is rotated as the spin gear is rotated, and the lower support unit, coupled to the upper support unit via the middle support unit, is rotated, so that the camera module, coupled to the lower support unit, is spun.

5. The support device according to claim 3, wherein
   a pan-worm fitting part is provided on a side or the coupling boss of the rotary support unit, which supports the worm wheel, so that the pan worm is fitted into the pan-worm fitting part,
   a screw part is provided at a predetermined position on the pan worm,
   the screw part of the pan worm and the worm wheel constitute a worm gear, while part of the pan worm is fitted into the pan-worm fitting part, and
   the worm wheel is rotated in the coupling boss of the rotary support unit by rotation of the pan worm, and the second middle support unit, integrated with the worm wheel, is panned, so that the lower support unit, coupled to the second middle support unit and the camera module, are panned.

6. A support device for camera modules, comprising:
   a camera-module support unit including a spin-rotation unit having a spur gear comprising two toothed wheels to spin a camera module, and the camera module coupled to the spin-rotation unit;
   an outer casing unit surrounding the camera module; and
   a spin lever installed in the outer casing unit, wherein
   the spin lever and one of the toothed wheels of the spur gear are connected to each other via a wire which is formed by twisting a plurality of strands of steel, and
   the spin lever is coupled to one of the toothed wheels of the spur gear to transmit rotating force of the spin lever, and
   the spin-rotation unit is rotated by the spur gear, operated by the rotation of the spin lever, so that the camera module is spun.

7. A support device for camera modules, comprising:
a camera-module support unit including a pan-tilt unit having a worm gear to pan a camera module, and the camera module coupled to the pan-tilt unit:
an outer casing unit surrounding the camera-module support unit; and
a pan lever installed in the outer easing unit, wherein
the pan lever and the worm or the worm gear are connected to each other via a wire which is formed by twisting a plurality of strands of steel, and
the pan lever is coupled to a worm of the worm gear to transmit rotating force of the pan lever, and
the pan-tilt unit is panned by rotation of the worm wheel coupled to the worm as the pan lever is rotated, so that the camera module is panned.

8. The support device according to claim 6, wherein the outer casing unit comprises:
a base coupling unit coupled to the camera-module support unit, having on an outer circumference thereof a guide groove, and fitted into a base support unit; and
the base support unit, having on an inner circumference thereof a projecting ring, which is fitted into the guide groove, wherein:
when the base coupling unit is rotated in the base support unit along the projecting ring, the camera-module support unit is rotated, so that a horizontal observation angle of the camera module is adjusted.

9. The support device according to claim 6, wherein the outer casing unit comprises in a sidewall thereof a hole so that a camera-module controller is placed in the outer casing unit.

10. The support device according to claim 7, wherein the outer casing unit comprises:
a base coupling unit coupled to the camera-module support unit, having on an outer circumference thereof a guide groove, and fitted into a base support unit; and
the base support unit, having on an inner circumference thereof a projecting ring, which is fitted into the guide groove, wherein:
when the base coupling unit is rotated in the base support unit along the projecting ring, the camera-module support unit is rotated, so that a horizontal observation angle of the camera module is adjusted.

11. The support device according to claim 7, wherein the outer casing unit comprises in a sidewall thereof a hole so that a camera-module controller is placed in the outer casing unit.

* * * * *